United States Patent [19]

Lievens et al.

[11] Patent Number: 4,828,000
[45] Date of Patent: May 9, 1989

[54] STEEL SUBSTRATE WITH BRASS COVERING LAYER FOR ADHESION TO RUBBER

[75] Inventors: Hugo Lievens, Gent; Wilfried Coppens, Kortrijk - Marke, both of Belgium

[73] Assignee: N. V. Bekaert S.A., Zwevegem, Belgium

[21] Appl. No.: 107,991

[22] Filed: Oct. 14, 1987

[30] Foreign Application Priority Data

Oct. 31, 1986 [NL] Netherlands .......................... 8602758

[51] Int. Cl.$^4$ ............................................. B32B 15/06
[52] U.S. Cl. .................................... 152/451; 428/625; 428/659
[58] Field of Search ............... 428/624, 625, 626, 658, 428/659, 677; 152/451, 527, 556, 565

[56] References Cited

U.S. PATENT DOCUMENTS

| | | | |
|---|---|---|---|
| 4,502,895 | 3/1985 | Trubitsyn et al. | 148/11.5 Q |
| 4,569,382 | 2/1986 | Maxey et al. | 152/548 |

FOREIGN PATENT DOCUMENTS

| | | |
|---|---|---|
| 0102310 | 3/1984 | European Pat. Off. . |
| 0179517 | 4/1986 | European Pat. Off. . |
| 821437 | 12/1937 | France . |
| 1174055 | 3/1959 | France . |
| 43006 | 4/1981 | Japan ..................... 152/451 |
| 1250419 | 10/1971 | United Kingdom . |
| 1435647 | 5/1976 | United Kingdom . |
| 1559147 | 1/1980 | United Kingdom . |
| 2039580 | 8/1980 | United Kingdom . |
| 2063725 | 6/1981 | United Kingdom . |
| 1598388 | 9/1981 | United Kingdom . |
| 2076320 | 12/1981 | United Kingdom . |

OTHER PUBLICATIONS

"Adhesion of Brass-Plated Tire Cord to Rubber", by Wim J. van Ooij, (Wire Journal-Aug. 1978, pp. 40–46).

Primary Examiner—L. Dewayne Rutledge
Assistant Examiner—George Wyszomierski
Attorney, Agent, or Firm—Nixon & Vanderhye

[57] ABSTRACT

Steel substrate with brass covering layer to enhance adhesion to rubber particularly in humid atmosphere above ambient temperature wherein said covering layer has at its surface a (Cu/Cu+Zn)-ratio of not more than 0.2 the respective Cu and Zn contents being considered in at. %. In addition the content of carbon and inorganic impurities in the brass surface layer is low. A method for producing said brass covered substrate comprises the steps of shortly heating a normal brass covered substrate at between 250° and 350° C. in a vacuum atmosphere.

9 Claims, 1 Drawing Sheet

STEEL SUBSTRATE WITH BRASS COVERING LAYER FOR ADHESION TO RUBBER

The invention relates to a steel substrate, for instance a steel wire or steel cord provided with a brass covering layer to enhance adhesion to rubber as well as rubber products comprising such a steel substrate and method for the manufacture thereof.

Steel substrates with brass covering layers to enhance adhesion to rubber are commonly known, as well as rubber products such as vehicle tires, conveyer belts, drive belts, hoses and tubes reinforced with brass-plated steel substrates for instance in the form of wires, cords, laths or plates. Further, measures are known for choosing the composition of the brass covering layer, particularly at its outside surface, within certain copper/zinc ratios and possibly adding small amounts of iron, nickel, tin, maganese, cobalt, etc. in order to effect optimum and durable adhesion to various rubber compositions under different conditions. This technology is explained in the article: "Adhesion of brass-plated tire cord to rubber" by Wim J. Van Ooy (Wire Journal—August 1978 pages 40–46) and inter alia also in British Pat. Nos. 1,250,419, 1,435,647, 2,063,725, 2,039,580, 1,559,147, 2,076,320 and 1,598,388.

For some time, however, there has been a growing need to be able to effect and maintain very good adhesion between the brass-plated steel substrate and the adjacent rubber as well as corrosion resistance for the steel in all kinds of situations and operating conditions where the reinforced rubber products stay in a humid atmosphere, possibly at elevated temperature, or when slightly moist rubber is to be bonded to brass-plated steel cord. There is also an increasing wish to prevent a decrease in adhesion as a result of (thermal) aging and in the case of re-vulcanization (retreading). Finally, it is desirable to accelerate vulcanization so as to increase productivity. To this end, higher temperature and shorter vulcanization times would be applied, which may lead to "overcure". The decrease in adhesion strength is usually attributed to an excessive formation of cupric sulfide in the rubber/brass interface, which formation also depends on the copper concentration in the brass surface film constituting in fact part of the adhesion reaction layer. Humidity generally catalyzes the copper/sulfur reaction as a result of which too mush sulfur is taken from the rubber/brass interface on the one hand and cupric sulfide (without adhesive function) is formed on the other. Thermal aging leads after a certain time to the same phenomena via diffusion of sulfur from the rubber interface into the brass and reaction with copper to cupric sulfides without bonding function.

According to the invention, it has now been found, surprisingly, that it is possible to effect durable adhesion at enhanced humidity and temperature by maintaining at the surface of the brass covering layer a $Cu/Cu+Zn$ ratio (in atomic percent) of not more than 0.20 and preferably not more than 0.15. The current $Cu/Cu+Zn$ ratio in the surface films of the brass covering layers presently known is comprised between 0.25 and 0.45.

In addition to Cu and Zn, the brass surface of a common, brass plated, steel wire made by wire drawing also presents, as is well known, a considerable quantity of bound oxygen (partly as zinc oxide) as well as carbon originating from organic lubricant rests. The absolute copper content at the surface of a common brass covering layer mostly amounts to more than 8 at.% and increases very rapidly as we penetrate deeper into the covering layer, up to a level of approximately 50 at.% at a depth of approximately 500 Å. However, the absolute copper content at the surface of the brass covering layer will be considerably lower according to the invention, i.e. not more than 5.0 at.% and preferably even not more than 3.5 at.%.

A low $(Cu/Cu+Zn)$-ratio (e.g. $\leq 0.15$) coupled with a low absolute Cu content (e.g. $\leq 3.5$ at.% respectively) is also found to be advantageous.

The accompanying figures are diagrams of a number of composition characteristics and gradients thereof over the thickness of the brass covering layer for a cord treated according to the invention in comparison with an untreated cord.

The invention also relates to an original method for effecting said low copper contents and reduced $(Cu/Cu+Zn)$-ratios in the surface of the brass covering layer. A steel substrate with a common covering layer, an overall content of 60–72% Cu and 40–28% Zn with possibly other constituents, and the surface of which as usually contains at least a $(Cu/Cu+Zn)$-value of 0.25 is heated according to the invention in an inert atmosphere to a temperature of between 250° and 350° C. and then cooled down. In particular, the inert atmosphere is formed by a vacuum. Preferably, the temperature will be between 280° and 320° C. if an absolute pressure of not more than $10^{-1}$ Torr is applied. The residence time at the said high temperature will not exceed 4 sec. and will preferably even not exceed 1 sec. Cooling can be done in vacuum or in atmospheric air at ambient temperature.

The method can be carried out in a continuous process, a common brass-coated steel substrate being passed through a vacuum chamber and there being heated to the desired temperature through for instance electric induction, resistance or radiant heating and with a residance time at the desired temperature as specified hereinbefore.

Preferably, the vacuum treatment at elevated temperature will be applied to the brass-plated final product (e.g. steel cord) which is in this way optimally cleaned and conditioned for use. So, the consequences of these post treatments do not interfere in any way with the preceding manufacturing steps where for instance a higher Cu content at the brass surface is desired for the purpose of a smooth drawing process for brass-plated wire (avoiding $\beta$ brass). This is an additional advantage of the method according to the invention.

Figure 1:
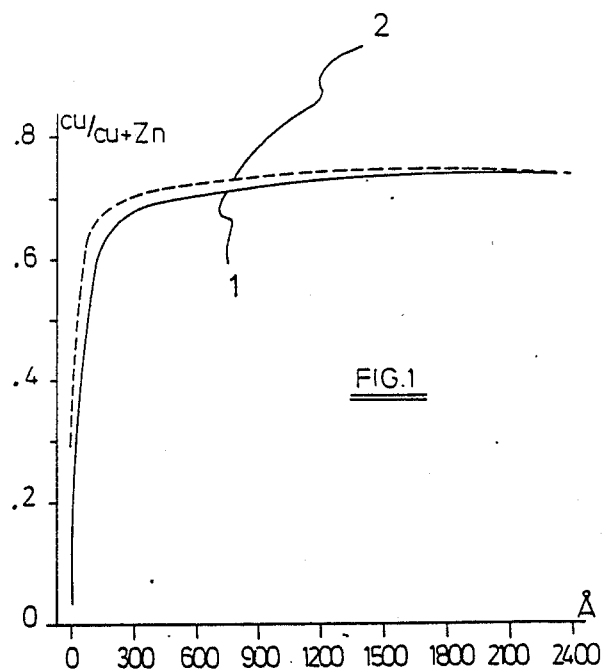
FIG. 1 shows the $(Cu/Cu+Zn)$-ratio.

A suitable apparatus for carrying out this method is described in further detail and shown in FIG. 1; reference number 2 in the applicants' related U.S. application Ser. No. 107,411 filed Oct. 13, 1987.

Heating is suitably effected by means of induction heating for the purpose of which an induction coil has been concentrically inserted in chamber 2 of said apparatus.

EXAMPLE

A common steel cord with construction $(3+9)\times 0.22+1\times 0.15$ is applied as starting product for the invention. Steel cord of the $(3+9)\times 0.22+1$ type is a cord with a core strand of 3 brass-plated steel filaments made via wire drawing, each having a diameter of 0.22 mm and surrounded by 9 identical steel filaments that are helicoidally twisted around it and which twisted assembly is further provided with a spirally wound wire. The single spiral wire has a diameter of 0.15 mm. The brass layer had an average bulk composition of about 63%wght Cu and 37 %wght Zn. The surface of the brass covering layer has the following composition in at.% and determined via Auger Electron Spectroscopy: copper: 8.3%; zinc: 19%; oxygen: 11.4%; carbon: 52.2%; the rest: inorganic impurities (S, Cl, Ca, N, Si). The Cu/Cu+Zn ratio is 0.3 (See reference sample 9 in tablets 1 and 2 hereinafter). In weight percent, this composition amounts to 18.3% Cu; 43.85% Zn; 6.45% oxygen; 22.10% carbon; the rest: impurities. The brass covering layer has a thickness of only 0.2–0.25 μm, which, as is known, mostly benefits the adhesion behavior.

As usual, the brass covering layer was obtained by successively applying a copper and a zinc layer to the wires followed by a thermodiffusion treatment and further drawing.

This cord is placed in a vacuum chamber in which the pressure is adjusted at $10^{-1}$ Torr and is heated there for a short time (by resistance heating) to a treatment temperature of 250° C., 300° C. and 350° C. respectively. Various heating periods and residence times (at temperature) are applied according to table 1 below: In a first test series, a longer heating period of 25 sec. to treatment temperature is combined with a residence time at this temperature of 4 sec., whereas in a second test series a shorter heating period of 10 sec. is combined with a shorter residence time at temperature of not more than 1 sec. According to a first experiment (A) the cords thus heated in vacuum are contiguously cooled in vacuum and according to a second experiment (B) they are cooled in air at ambient temperature. The compositions of the brass surface in the various cases are established and have been entered in the last columns of table 1.

For the purpose of establishing the adhesion behavior in rubber (according to ASTM-D-2229) the thus treated cords are embedded into a common industrial rubber composition for the carcass of vehicle tires and are vulcanized for 40 minutes at 145° C. under a pessure of 500 N/cm². The adhesion values are established according to said ASTM procedure and are compared with those of a cord that has not been treated according to the invention and that has been embedded into the same vulcanized rubber. From this it appears that the initial adhesion between cord and rubber (i.e. without steam aging treatment of the cord/rubber composite) hardly differs between a treated and an untreated cord. The adhesion values lie around an average of 640N.

However, after aging for 24 hours in a steam atmosphere (2.1 abs. bar) at 120° C. a noticeably higher adhesion value is noted for a treated cord (samples no. 1 up to and including 8) compared with a cord not treated according to the invention (sample no. 9). The improvement is greatest when heating is short (e.g. 10 sec.) at or in the region of 300° C. coupled with an immediate cooling in vacuum (see experiments A in table 1, samples no. 3 up to and including 6). Curve 1 in FIG. 1 indicates the average increase in the Cu/Cu+Zn ratio (determined in at.%) through the depth of the brass covering layer from the surface (0 Å) toward the interface with the steel substrate (depth=2400 Å) for samples no. 3 up to and including 6 in table 1 (both experiment A and B). As this ratio shows little distribution for samples 3 up to and including 6, the average curve 1 can be considered representative of the result of the treatment according to the invention. Dotted line 2 shows the analogous course for the untreated reference sample 9 the Cu/Cu+Zn ratio of which is situated around 0.3 at the brass surface, whereas this ratio is noticeably lower (0.04 up to 0.15) for the treated samples (3 up to and including 6).

Short heating to approximately 300° C. and cooling directly afterward (residence time of 1 sec.) at this temperature offers the advantage that the treatment particularly lends itself to be carried out in a continuous process. Apart from that, analysis of the brass-surface composition of the cord shows that the (bound) oxygen content at the surface is on average somewhat higher than for an untreated brass surface. This is probably due to the presence of small quantities of $O_2$ in the vacuum chamber near the hot wire surface causing some oxidation. A favourable effect of this small oxygen concentration may be that zinc oxides are formed more easily at the brass surface as a result of which the copper concentration may be reduced there. Indeed the pronounced affinity of zinc for oxygen at higher temperature will probably promote the diffusion of zinc to the brass surface at the expense of copper. In each case, a higher zinc content is established (higher than the 19% of reference sample 9 from table 2 below) in the brass

TABLE 1

| Sample no. | Cooling | Adhesion (N) after aging | 25/4 (sec.) 250° | 25/4 (sec.) 300° | 25/4 (sec.) 350° | 10/1 (sec.) 250° | 10/1 (sec.) 300° | 10/1 (sec.) 350° | at. % Cu (Surf) | Cu/Cu + Zn (%) (Surf.) |
|---|---|---|---|---|---|---|---|---|---|---|
| 1 | A | 380 | X | | | | | | 3.8 | 17.3 |
|   | B | 440 | X | | | | | | 1.15 | 3.7 |
| 2 | A | 448 | | | | | X | | 5.6 | 16.2 |
|   | B | 498 | | | | | X | | 1.04 | 2.9 |
| 3 | A | 533 | | X | | | | | 3.2 | 8.0 |
|   | B | 520 | | X | | | | | 0.8 | 2.3 |
| 4 | A | 538 | | | | | X | | 1.0 | 2.6 |
|   | B | 453 | | | | | X | | 2.9 | 8.8 |
| 5 | A | 505 | | X | | | | | 0.9 | 3.4 |
|   | B | 482 | | X | | | | | 1.8 | 4.95 |
| 6 | A | 552 | | | | | X | | 3.4 | 11.2 |
|   | B | 470 | | | | | X | | 0.85 | 1.95 |
| 7 | A | 480 | | | X | | | | 0.95 | 2.3 |
|   | B | 350 | | | X | | | | 4.15 | 8 |
| 8 | A | 520 | | | | | | X | 1.9 | 4.3 |
|   | B | 405 | | | | | | X | 4.3 | 8.2 |
| 9 | (ref.) | 361 | | | | | | | 8.3 | 30 | surface of the cords treated according to the invention: the absolute content for samples 1-8 is situated between 26 and 50 at.%. The increased ZnO content at the brass surface may in itself also result in an enhanced adhesion behavior after aging in the case that a rubber with normal S content is applied, but MBTB (2-morpholinothiobenzothiazolesulfonamide) being used as vulcanization accelerator.

Table 2 gives average surface compositions (at.%) of the brass covering layer for the various treatment conditions.

TABLE 2

| Experiment | | Average surface compositions (at. %) | | | Ref. untreated (9) |
|---|---|---|---|---|---|
| | | 250° C. | 300° C. | 350° C. | |
| A | Cu | 4.65 | 2.12 | 2.48 | 8.3 |
| | Zn | 28.31 | 31.47 | 42.62 | 19.0 |
| | O | 15.52 | 16.55 | 22.01 | 11.4 |
| | C | 45.88 | 43.46 | 26.47 | 52.2 |
| B | Cu | 2.62 | 1.50 | 3.72 | 8.3 |
| | Zn | 31.67 | 35.27 | 46.71 | 19.0 |
| | O | 15.90 | 19.03 | 23.27 | 11.4 |
| | C | 42.8 | 34.7 | 17.55 | 52.2 |

In addition, the composition analysis of the treated brass surface (samples 1 to 8) indicates on average a decrease in the carbon content in this surface compared with reference sample 9. This seams to indicate that heating in vacuum causes organic lubricant rests (or residual deposits) to be broken down to low-molecular organic carbon compounds or $CO_2$ which then evaporate to be exhausted out of the vacuum chamber. This would in fact result in a cleaning of the brass surface, which could help to enhance the adhesion behavior particularly in a humid environment at a temperature above ambient temperature. Another feature established in this respect is that the total content of inorganic impurities (at.%) on the brass surface (Cl, S, Ca, Si and N) averages 6 at.% at the most when cooling is done in vacuum whereas an untreated brass surface (reference sample 9) contains more than 9 at.% of these impurities.

Heating to 350° C. (at a pressure of $10^{-1}$ Torr) probably results in excessive oxidation of the brass surface as a result of which the adhesion values decrease. A higher vacuum (e.g. a pressure of $10^{-2}$ Torr) could probably slow down this oxidation tendency (even at 350° C.), which would in turn favour the adhesion behavior.

When heating to 250° C., however, the breakdown of lubricant rests (C content) will probably be insufficient. The diffusion of Zn to the brass surface (with the effect of a decrease in the Cu concentration there) will possibly also be inadequate to noticeably improve the adhesin behavior. Anyway, it is found that when heating in vacuum to 200° C. there hardly is any change in the (Cu/Cu+Zn)-ratio of the brass surface compared with an untreated brass covering layer and in adhesion behavior after steam aging compared with an untreated brass-plated cord.

Figure 2:
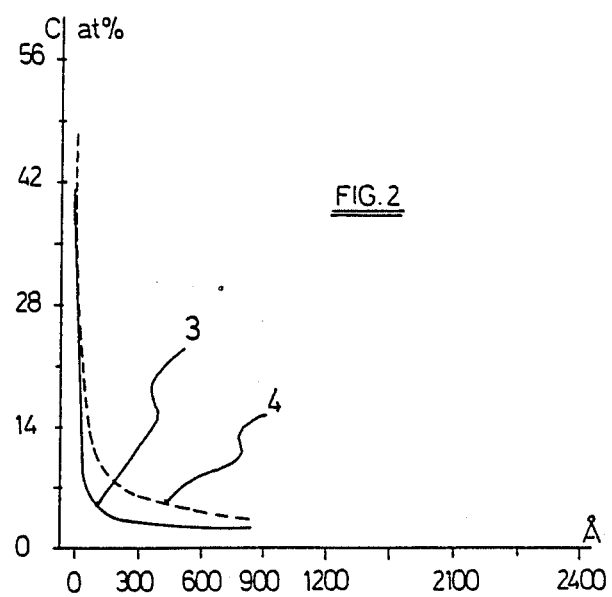
FIG. 2 illustrates the carbon content in the covering layer.

Curve 3 in FIG. 2 represents the course of the average carbon content (at.%C.) over the thickness of the brass covering layer for samples no. 3 up to and including 6 (experiments A and B). This content decreases very rapidly from the brass surface ($\pm 39$ at.%) to below 15 at.% ($\pm 10$ at.%) at a depth of about 50 Å in the surface film. The dotted line 4 for the untreated reference sample no. 9, however, shows a gradient from approximately 52 at.% at the surface only to approximately 30 at.% at a depth of 50 Å.

It was also found that the low (Cu/Cu+Zn)-ratios in the brass surface can be effected via a plasma treatment (plasma cleaning). (Cu/Cu+Zn)-values of 0.11 and 0.13 respectively are measured at the brass surface after a certain plasma cleaning with Argon (10 Torr, 200 V, 100 mA, 30 sec. and 15 sec. respectively) of reference sample 9 (and without preheating in vacuum). The carbon concentrations at the brass surface then amount to 36 at.% and 35 at.% respectively. The adhesion values to rubber were established in accordance with the procedures specified hereinbefore and amounted to 485N and 513N respectively. The treatment according to the invention can of course also be applied to steel substrates with brass covering layers to which other adhesion enhancing elements such as for instance Co, Sn, Ni or Mn have already been added beforehand.

Steel substrates according to the invention are for instance steel wires or steel cords made thereof with wire diameters of between 0.1 and 0.4 mm and with a tensile strength of at least 2400 $N/mm^2$ and if desired exceeding 3000 $N/mm^2$. The usual covering layers on these wires have a thickness of between 0.10 and 0.40 $\mu$m but a thickness below 0.25 $\mu$m, for instance 0.12 to 0.22$\mu$, will be preferred.

The invention also relates to said steel substrates coated with rubber, i.e. some vulcanized elastomeric composition, as well as rubber objects into which the substrates have been embedded, for instance for the reinforcement thereof. The steel substrates according to the invention are particularly suitable to reinforce carcass and/or tread of vehicle tires for passenger cars or trucks giving them a longer service life, particularly due to the increased corrosion resistance and slower aging in a humid and/or hot environment. Vehicle tires comprising steel wires or cords with a brass covering layer post-treated according to the invention are consequently also part of the invention as well as conveyor belts, high-pressure hoses and drive belts into which said steel substrates have been embedded.

We claim:

1. Steel substrate with brass covering layer to enhance adhesion to rubber in a humid atmosphere above ambient temperature, wherein said covering layer has a ratio of Cu/Cu+Zn at its surface of greater than zero but not more than 0.15, the respective Cu and Zn contents being considered in at.%, and wherein the copper content at the brass surface does not exceed 3.5 at.%.

2. Steel substrate according to claim 1 wherein the zinc content at the brass surface is within the range of between 26 and 50 at.%.

3. Steel substrate according to claim 1 wherein the brass covering layer has a thickness of not more than 0.25 $\mu$m.

4. Steel substrate according to claim 1 wherein the carbon content at a depth of 50 Å measured from the surface in the brass covering layer does not exceed 15 at.%.

5. Steel substrate according to claim 1 wherein the brass covering layer contains at its outer surface an average content of inorganic impurities of at most 6 at.%.

6. Steel substrate according to claim 1 which is in the form of steel wire or steel cord, with a wire diameter of between 0.1 and 0.4 mm and with a tensile strength of at least 2400 $N/mm^2$.

7. Steel substrate according to claim 1 which is coated with rubber.

8. Rubber object reinforced with a brass-plated steel substrate according to claim 1.

9. A steel substrate having a brass surface region consisting essentially of a layer of thermally diffused copper and zinc, wherein the copper content in an outer surface of said layer is not greater than 3.5 at.%, and the zinc content in said outer surface of said layer is within the range of between 26 and 50 at.%, with the ratio of Cu/Cu+Zn in said outer surface of said layer being not more than 0.15.

* * * * *